United States Patent

[11] 3,628,306

| [72] | Inventors | Sylvester O. Jacobson;<br>Norman M. Arneson, both of Eau Claire, Wis. |
|---|---|---|
| [21] | Appl. No. | 40,583 |
| [22] | Filed | May 26, 1970 |
| [45] | Patented | Dec. 21, 1971 |
| [73] | Assignee | Jams, Ltd.<br>Eau Claire, Wis. |

[54] PACKAGING APPARATUS
1 Claim, 6 Drawing Figs.

[52] U.S. Cl. .................................................. 53/182, 53/76
[51] Int. Cl. .................................................. B65b 9/02
[50] Field of Search ........................................... 53/182; 156/515

[56] References Cited
UNITED STATES PATENTS

| 3,158,973 | 12/1964 | Monaghan .................... | 53/182 X |
| 3,195,289 | 7/1965 | Cochrane .................... | 53/182 |
| 3,508,378 | 4/1970 | Fehr et al .................... | 53/180 |
| 3,543,478 | 12/1970 | Von Brecht et al ........... | 53/182 |

*Primary Examiner*—Travis S. McGehee
*Attorneys*—Joseph G. Werner, Theodore J. Long, John M. Winter and James A. Kemmeter ABSTRACT: Apparatus for packaging articles between two heat-sealable plastic films. The apparatus feeds roll-stock film over an infeed conveyor and articles to be packaged are placed on the film. A second roll-stock film is fed over the top of the articles and sealed to the bottom film by a transverse timed-drop heat-sealing knife. The sealing knife operates between spring tensioned clamping bars which hold the films together both fore and aft of the sealing knife. The lower clamping bar is provided with a series of air vents for cooling the transverse seals. The sides of the package are sealed by a pair of heat-sealing wheels which are insulated by inwardly spaced discs to protect the articles being packaged against scorching. A perforator saw wheel runs on the top film as it passes over a rubber roller to provide a perforated line of weakness in the top film.

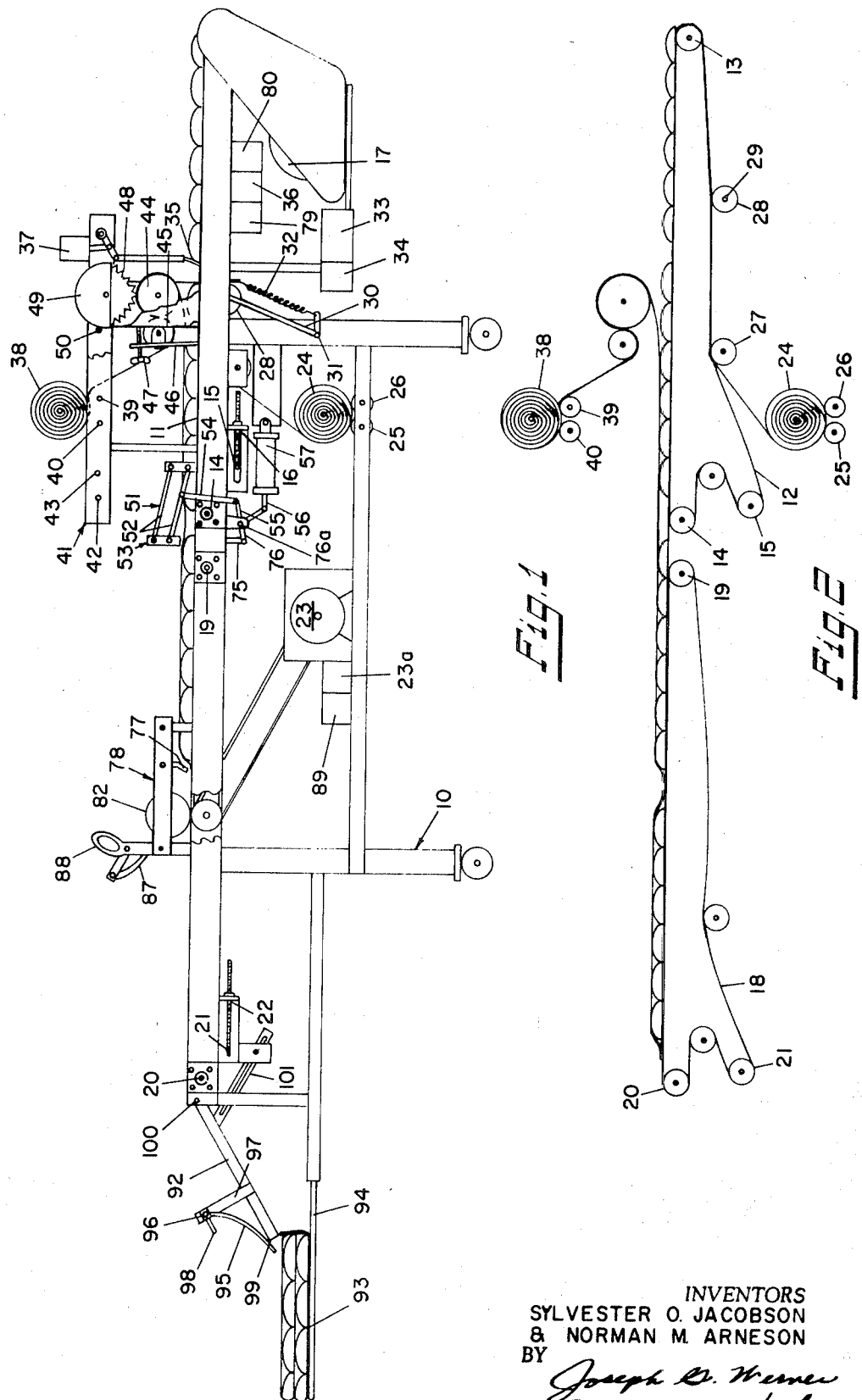

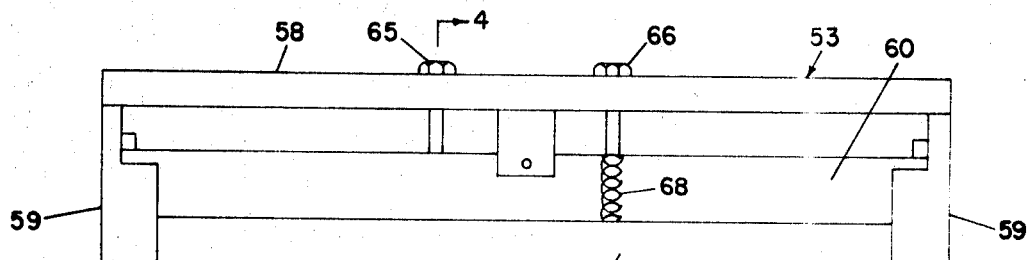
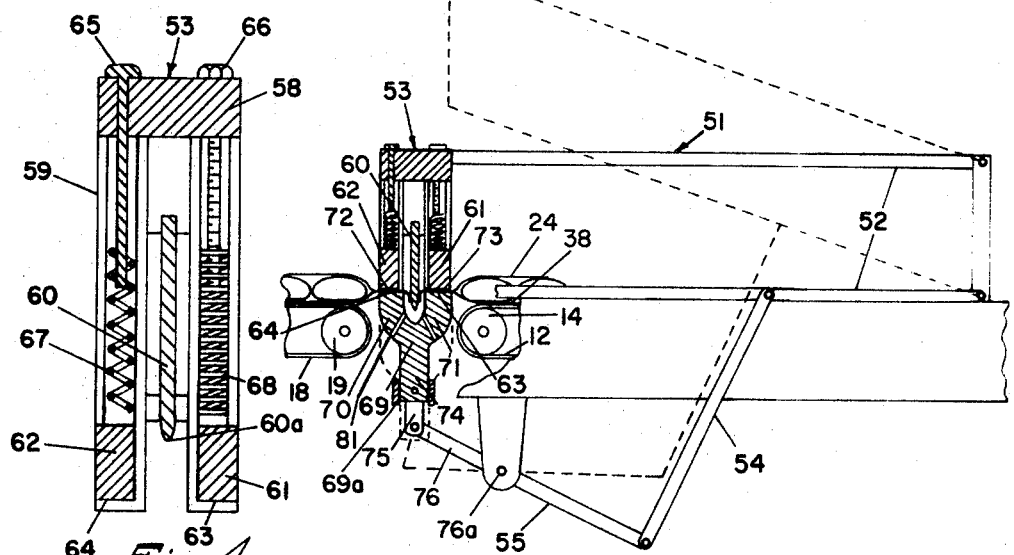
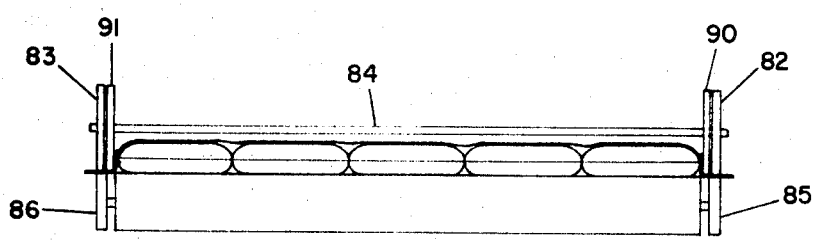

PACKAGING APPARATUS

FIELD OF THE INVENTION

This invention relates generally to apparatus and a method for package making. U.S. Class 53, International Class B65b.

SUMMARY OF THE INVENTION

Our invention generally comprises a heat-sealing apparatus and method for packaging articles between two plastic films. The apparatus feeds a roll-stock film over the top run of a continuous infeed belt and the articles to be packaged, such as for example, several dozen individual, sliced sandwich buns placed on the film. A second roll-stock film is then fed over the top of the articles. One advantage of our invention over known apparatus and methods is believed to be the running of the bottom film along with the infeed conveyor and placing the articles to be packaged directly on the moving film rather than on an infeed belt which feeds the articles onto the film as in the known manner. Our method prevents disorientation and bunching of the articles during infeed.

A timed-drop heat-sealing knife extending across the line of travel of the films seals the top and bottom films together and severs the individual packages while the films are being held in overlapped, mating relation by spring tensioned clamping bars on both sides of the heat-sealing knife. The holding of the films together in mating relation under spring tension, before, during and after the sealing knife engages the film provides smooth, wrinkle-free seals and prevents the seals from being ruptured as the knife is withdrawn from its sealing position. The lower clamping bar is provided with a plurality of air vents to permit cooling air to circulate along both sides of the sealing knife to aid in the rapid cooling of the seals to prevent rupture thereof during withdrawal of the sealing knife and release of the clamping bars immediately thereafter.

The sides of the package are sealed by a pair of heat-sealing wheels running along the edge of the advancing overlapped films. The heated sealing wheels are provided with insulator discs spaced slightly inwardly of the sealing wheels to prevent scorching of the package and articles.

A rotatable perforator wheel runs on the top film as it passes over a grooved rubber roller to produce a continuous perforated line of weakness in the top film to facilitate easy tear opening of the package.

A flexible guide flap is pivotally mounted to engage against the down chute in a flexed manner to prevent flopping over of the last line of loose articles in the package as the package is moved across the end of the chute and out of the machine.

Further objects, features and advantages will be apparent from the following detailed description taken in conjunction with the accompanying drawings showing a preferred embodiment exemplifying the principles of our invention.

While the apparatus and method will be described herein in connection with the packaging of bakery goods, specifically several dozen, individual, sliced, sandwich buns arranged in one layer, it is understood that the apparatus and method are not limited to the packaging of any particular number or type of articles.

BRIEF DESCRIPTION OF THE DRAWINGS

FIG. 1 is a side elevation view of a packaging machine embodying the principles of our invention.

FIG. 2 is a schematic side elevation view showing the infeed and outfeed conveyor systems of the machine shown in FIG. 1.

FIG. 3 is an elevation view of the carriage assembly, sealing knife and upper clamping bars of the machine shown in FIG. 1.

FIG. 4 is a cross-sectional view taking along line 4—4 of FIG. 3.

FIG. 5 is a cross-sectional view showing the heat-sealing mechanism in full lines in its sealing and severing position and in dotted lines in its rest position.

FIG. 6 is an end view showing the heat-sealing wheels and insulator discs.

DESCRIPTION OF A PREFERRED EMBODIMENT

Referring now more particularly to the drawings wherein like numerals refer to like parts throughout the several views, FIG. 1 shows a side elevation view of a machine for packaging 30 sliced sandwich buns between two roll-stock plastic films.

As shown in FIGS. 1 and 2, the machine has a wheel supported frame 10 providing a bed 11 having an infeed conveyor belt 12 mounted on infeed rollers 13 and 14 with a tensioning roller 15 carried on an adjustable mount 16. Infeed belt 12 is driven from motor 17 mounted on the lower portion of the machine frame.

A continuous conveyor belt 18 for outfeed is mounted on rollers 19 and 20 with a tensioning roller 21 carried on an adjustable mount 22. The outfeed conveyor belt is driven from motor 23 mounted on the lower portion of the machine frame and controlled by control switch 23a.

A first roll of plastic film 24 is rotatably supported on idler rollers 25 and 26. The film 24 is run over a roller 27 positioned so as to frictionally engage the film 24 against the bottom run of the infeed conveyor belt 12. A pair of transversely spaced wheels 28 are mounted on a shaft 29 journaled in the upper end of a support arm 30 having its lower end pivotally mounted at 31 to the frame. The wheels 28 maintain the side edges of the film 24 in frictional engagement against the underside of the bottom run of the infeed conveyor belt 12 through the tension of a spring 32. The frictional engagement of the film 24 with the infeed conveyor belt 12 causes the belt to move the film along with it around the drive roller 13 and along its top run.

The operation of the infeed conveyor belt 12 is controlled by a knee operated actuator 33 for the infeed control switch 34. The operator stands along side of the machine and hand loads the articles to be packaged, (in the example shown, 30 sliced sandwich buns in six transverse rows of five buns each) directly on the bottom film 24 extending over the top run of the infeed conveyor belt 12. The buns are positioned against a transverse loading bar 35. The operator then depresses actuator 33 with his knee starting the infeed belt 12 and film 24 moving. The actuator 33 also operates a control switch 36 which activates the solenoid 37 for raising loading bar 35 which allows the buns to move forwardly along with the film 24 which forms the bottom of the finished package.

A second roll of plastic film 38 is rotatably carried on idler rollers 39 and 40 journaled in an upper frame assembly 41 above the bed of the machine. An additional roll of plastic film (not shown) may be held in readiness on a second set of idler rollers 42 and 43.

As shown in FIGS. 1 and 2, the top film 38 is run over a rubber feed roller 44. The film is held in frictional engagement with feed roller 44 by a second roller 45 mounted on a resilient metal support 46 which can be flexed toward and away from the drive roller by an adjusting screw 47 acting against the edges of a vertical standard of the upper frame assembly 41.

As the top film 38 passes over the rubber feed roller 44, a perforator disc saw 48 forms a continuous, longitudinal, perforated line of weakness in the film to provide a quick tear opening feature for the package. The disc saw 48 is journaled in a safety housing 49 which is pivotally attached at one end to a supporting bar 50. Thus, the weight of the saw is on the rubber feed roller and the saw runs on and perforates the film as the film passes over the feed roller which is rotated in conjunction with the infeed conveyor belt.

The mechanism for sealing the films 24 and 38 together transversely of the direction of travel through the machine and for simultaneously severing each film within the sealed area to form two packages comprised a carriage assembly generally shown at 51 in FIG. 1 and in more detail in FIGS. 3–5.

The carriage assembly 51 has a pair of pivotally attached arms 52 on each side of the machine for raising and lowering the transverse carriage frame 53 between an upper rest position shown in FIG. 1 and in broken lines in FIG. 5 and a lower working or sealing position shown in full lines in FIG. 5. The carriage assembly is raised and lowered through linkage arms 54 and 55 which in turn are controlled by the piston 56 of an air cylinder 57.

The transverse carriage frame 53 comprises an upper crossmember 58 having substantially vertical depending side channel members 59 positioned both fore and aft of a heat-sealing knife 60 which is fixedly mounted in the carriage frame.

A pair of upper clamping bars 61 and 62 are mounted in the side channel members 59 for reciprocal movement. The bars 61 and 62 are freely slidable vertically in the channel members 59 and when the carriage frame 53 is in its upper rest position, bars 61 and 62 rest in the lower ends of the channel members as shown in FIGS. 3 and 4. The bars 61 and 62 provide transverse upper clamping surfaces 63 and 64 on their under sides.

A pair of threaded adjusting screws 65 and 66, having springs 67 and 68, respectively, depending from the bottom ends thereof, extend downwardly through the crossmember 58 whereby one spring is positioned above each of the upper clamping bars.

As best seen in FIG. 4, the clamping surfaces normally are positioned somewhat below the edge 60a of the sealing knife 60.

As best shown in FIG. 5, a lower clamping bar 69, substantially U-shaped in cross section, is positioned between the infeed and the outfeed conveyor belts and supports for reciprocal movement between an upper working position shown in full lines and a lower rest position indicated in dashed lines. The U-shaped lower clamping bar 69 has a pair of upstanding flanges 70 and 71 providing a pair os spaced clamping surfaces 72 and 73 along the upper edges thereof.

The U-shaped clamping bar 69 has a depending flange 74 pivotally attached to linkage arm 75 which in turn is attached to arm 76. Arm 76, like linkage arm 55 of the linkage for the carriage assembly, is pivotal about a fixed pivot 76a and moved thereabout by the piston 56 of the air cylinder 57.

As shown in FIG. 1, a pivotal control lever 77 extends downwardly from a second upper frame assembly 78 across the path of the advancing buns. As the lever 77 is engaged and pivoted upwardly by the first transverse row of buns, it deactivates the control switch 34 when the films between adjacent groups of 30 buns extend across the sealing area provided by the space between the infeed and the outfeed conveyor belts as best shown in FIG. 5. The raising of control lever 77 by the buns, also signals the loader bar control 36 to lower the loading bar 35 and activates the air cylinder 57 to extend piston 56 thereby moving the linkages to the full line position shown in FIG. 5. This action causes the carriage frame 53 to move downwardly and the U-shaped lower clamping bar to move upwardly to the position shown in full lines in FIG. 5. As the carriage frame moves downwardly it, of course, carries with it the heat-sealing knife 60 and upper clamping bars 61 and 62. The upper clamping bars 61 and 62, carrying the upper clamping surfaces 63 and 64 below the edge 60a of the heat-sealing knife 60, first engage the upper film 38 and carry it downwardly until the upwardly moving lower clamping surfaces 72 and 73 bring the lower film 24 into mating relation with the upper film. As in FIG. 5, when the films are brought together, the downward movement of the upper clamping bars is substantially stopped by the lower clamping bar while the carriage frame 53 and heat-sealing knife 60 continue downwardly to the sealing and severing position shown in FIG. 5.

In other words, the upper clamping bars are moved upwardly relative to the carriage frame 53 and sealing knife 60 against the bias of springs 67 and 68 by the lower clamping surfaces 72 and 73 before the lower edge 60a of the heat-sealing knife engages the films. A control 79 controls the heat of the sealing knife 60 and a dwell-timer 80 maintains knife in its sealing and severing position for a predetermined time, generally about 1 to 2 seconds. At the end of the dwell time, the piston 56 of the air cylinder is retracted thus raising the carriage frame 53 with its associated heat-sealing knife and upper clamping bars and lowers the lower clamping bar. This releases the forward package from the upper and lower clamping surfaces 64 and 72 and that package is then advanced by the continuously moving outfeed conveyor belt into the heat-sealing wheel assembly for sealing the longitudinal edges of the package.

It will be noted that in accordance with the principles of our invention the films to be sealed are held together in mating relation under spring tension just before, during and after the heat-sealing knife engages the films, thus providing the formation of a smooth, wrinkle-free seal and preventing that seal from being ruptured by withdrawal of the sealing knife.

As best shown in FIG. 5, the U-shaped lower clamping bar 69 has a plurality of air vents 81 formed therein below the clamping surfaces 72 and 73. These vents allow air to circulate along both sides of the sealing knife to aid in the rapid cooling of the seals to prevent rupture thereof during withdrawal of the sealing knife and release of the clamping bars immediately thereafter.

As shown in FIGS. 1 and 6, the edge sealing mechanism comprised a pair of heated metal sealing wheels 82 and 83 mounted on an axle 84. The heat-sealing wheels engage and run on rubber mating wheels 85 and 86 in the well known manner to seal the films together along their longitudinal edges. The rubber wheels are driven from motor 23. The axle 84 of the heat-sealing wheels is carried on arms 87 which can be pivoted upwardly by manipulation of lever handle 88 thus raising the heat-sealing wheels off of the rubber mating wheels when not in use to prevent burning of the rubber wheels and to retard deterioration of same. Control 89 controls the heat of the heat-sealing wheels 82 and 83. The heat-sealing wheels are provided with insulated discs 90 and 91 spaced slightly inwardly of the sealing wheels to prevent scorching of the package and articles.

After passing through the heat-sealing wheel assembly, the outfeed conveyor belt transports the now sealed package onto a downchute 92 from which the package slides into a delivery tray 93 supported on telescoping support racks 94. The downchute is provided with a flexible guide flap 95 preferably made of canvas, rubber or the like. The top end of the guide flap is pivotally mounted at 96 above the downchute on support arms 97 and a weight in the form of handle bar 98 extends away from the pivot point 96 thereby flexing the guide flap over the edge 99 of the downchute. As the package of buns is slid down the chute the lower edge of the guide flap is raised somewhat and drags across the top of the package thereby preventing the last transverse row of buns from flopping over as it passes across the rear edge of the downchute into the delivery tray. Since the buns are sliced and disconnected from one another, that is, loose in the package, the flopping over of the last row of buns would completely disorient the buns and ruin the package.

The downchute is pivotally attached at 100 to the frame of the machine and the angle thereof may be varied by adjusting slide mechanism 101. When the machine is not in use, the telescoping support racks 94 may be pushed in and the chute placed in a straight down position to facilitate moving and storage of the machine.

We Claim:

1. In a packaging machine having means for advancing two plastic films in overlapping relation, the improvement comprising:
   a. a carriage frame mounted on said machine for movement between an upper rest position and a lower working position,
   b. a pair of substantially parallel spaced elongate upper clamping surfaces mounted in said carriage frame transversely to the direction of travel of said films for substantially vertical reciprocal movement in said carriage frame,
   c. a lower clamping bar having a generally U-shaped cross section and having a pair of flanges providing a pair of lower clamping surfaces,
   d. a plurality of air vents formed in said flanges along the length of said lower clamping bar below said lower clamping surfaces, e. a heat-sealing knife mounted in said carriage frame for movement therewith between said upper rest position and said lower work position, said knife being positioned in said carriage frame between said spaced upper clamping surfaces, and f. means for lowering said carriage frame to bring said upper and lower clamping surfaces together to hold said films therebetween and to bring said heat-sealing knife into sealing engagement with said films between the area where the films are held by said upper and lower clamping surfaces.

* * * * *